United States Patent [19]
Fabian

[11] Patent Number: 5,646,371
[45] Date of Patent: Jul. 8, 1997

[54] ELECTRICAL OUTLET BOX AND PLATE THEREFOR INCORPORATING A REAR SUPPORT BRACKET

[75] Inventor: Mark Edward Fabian, St. Jean, Canada

[73] Assignee: Thomas & Betts Corporation, Memphis, Tenn.

[21] Appl. No.: 227,748

[22] Filed: Apr. 13, 1994

[30] Foreign Application Priority Data

Apr. 23, 1993 [CA] Canada .................................. 2094790

[51] Int. Cl.$^6$ ................................................. H01R 13/46
[52] U.S. Cl. ........................... 174/58; 248/906; 220/3.6; 220/3.9
[58] Field of Search ...................... 248/906; 174/58, 174/48; 220/3.3, 3.5, 3.6, 3.9

[56] References Cited

U.S. PATENT DOCUMENTS

| | | | |
|---|---|---|---|
| 4,399,922 | 8/1983 | Horsley | 220/3.6 |
| 4,732,356 | 3/1988 | Medlin, Sr. | 248/27.1 |
| 4,844,275 | 7/1989 | Schnell et al. | 220/3.9 |
| 4,955,825 | 9/1990 | Groth et al. | 439/535 |
| 5,354,953 | 10/1994 | Nattel et al. | 174/54 |

Primary Examiner—Kristine L. Kincaid
Assistant Examiner—Dean A. Reichard
Attorney, Agent, or Firm—Michael L. Hoelter; Salvatore J. Abbruzzese

[57] ABSTRACT

An outlet box for a conventional electrical receptacle or like includes a rear support bracket extending rearwardly from one side thereof. The bracket is generally L-shaped and can include a weakened portion, to enable it to be bent. The bracket abuts an inner face of a wall panel, to prevent rearward movement of the outlet box. At the front, a frame can be attached to or integral with the side wall of the outlet box, for the mounting of communication cables. For this purpose, the frame can include one or more tabs to which communication cables can be initially secured. The tabs are deflectable internally, to abut the inner face of a wall panel around the outlet box and the frame, to prevent forward movement of the outlet box.

34 Claims, 5 Drawing Sheets

5,646,371

ELECTRICAL OUTLET BOX AND PLATE THEREFOR INCORPORATING A REAR SUPPORT BRACKET

FIELD OF THE INVENTION

This invention relates to an electrical outlet box and plate therefor, and more particularly relates to an electrical power outlet box, including a cable holding device for holding a communication cable beside the outlet box.

BACKGROUND OF THE INVENTION

The number of communication outlets, such as telephones and cable connections, which have to be located close to an electrical receptacle, has greatly increase during the last few years. This has been caused by the increased use of communication, entertainment and other electronic equipment, such as telephones, telephone recording machines, facsimile transfer equipment (faxes), PC computers, cable connected television, VCR's, etc.

The electrical code does not allow mixing of power and communication cables in the same conduit or enclosure without a physical barrier between them, and this is the case in most jurisdictions.

At present, a power receptacle is attached to an electrical outlet box and a wall plate is mounted on this power receptacle. It is then necessary to provide a communication receptacle, at a separate location, which is attached to a wall plate mounted directly to another outlet box.

Usually, the boxes are mounted on wall studs with the two boxes, one containing the communication connector and the other the power receptacle being 16 inches or 24 inches apart, the distance between studs. This contributes to the maze of cables often present behind communication equipment.

In normal construction practice, the wall studs are erected first, forming a skeleton to which later wallboards are attached. While the skeleton is still open the electrician mounts the outlet boxes, and places the power and communication cables in the spaces between the studs. He then brings the ends of the power cable inside the electrical box, which cable remains loose until the wallboard is in place. The electrician then returns to the job site to connect the loose cable wires to the receptacle and mounts the receptacle together with the receptacle plate on top of the box.

The communication cable, however, is normally left hanging loose, behind the communication connector mounting bracket, until the wallboard is mounted and the electrician returns to connect the communication cable wires with the communication connector. This presents some difficulty because the electrician has to first find the communication cable. This has to be found through an access hole which is only as large as the communication bracket, approximately 2 inches×3 inches, and the electrician frequently has to use a hook to find and pull out the communication cable.

A more recent proposal is found in our earlier Canadian Patent application Serial No. 2,048,524, filed 07 Aug. 1991. This provides a cable holding device for holding a communication cable beside an electrical power outlet box. The device has a frame having a main portion and a base portion, which are at right angles to one another. The base portion has been adapted to be secured to the side of an outlet box, so that the frame extends outwardly therefrom. The frame has at least one tab to which a communication cable can be secured, to locate the free end of the communication cable in position, ready to be grasped by an electrician, for attachment to the connector.

The requirement for both communication and power cables is frequently found in industrial and commercial buildings. Further, it is common for dividing walls in such buildings to be constructed using metal studs. This presents an additional problem of preventing movement of the studs when the drywall is installed. The 1990 Canadian Electrical Codes states: "Where boxes are mounted on metal studs, an additional support should be provided to prevent the movement of the studs when drywall is installed."

Consequently, if the bracket described in our earlier application is to be mounted with an outlet box on a metal stud, an additional support is required. This support must be capable of preventing both forward and backward movement of the box and bracket relative to the drywall. The common solution, at the present time, is for an electrician to cut a piece of the metal stud, and attach it with screws to the opposite side of the box wall. This is relatively time consuming and inconvenient. Further, it prevents the use of a bracket as described in our earlier Canadian patent application.

SUMMARY OF THE PRESENT INVENTION

In accordance with one aspect of the present invention, there is provided an electrical outlet box having a top, bottom, first and second sides and a back, and defining a rectangular front opening, the outlet box including a rear support bracket secured to one side thereof and extending rearwardly from the front opening, for supporting the outlet box against one wall panel, to limit rearward movement thereof.

Preferably, the outlet box includes means for abutting a second wall panel surrounding the rectangular front opening of the outlet box, to prevent forward movement to the outlet box. More preferably, this means comprises a device for holding a communication cable beside the outlet box, the device comprising a frame having a main portion attached to one side of the outlet box, substantially at a right angle thereto, and at least one tab to which the communication cable may be secured. The tab is deflectable to a position abutting the inner face of such a second wall panel.

The present invention also provides a plate, for use in forming an outlet box, the plate comprising: a side portion including means for attachment to top, bottom, and back portions of an outlet box; and a rear support bracket comprising a side panel and a rear panel, the side panel being substantially coplanar with the one side portion and attached thereto, and the rear panel being generally perpendicular to the side panel, for abutting a wall panel. Preferably, this plate includes a device for holding a communication cable beside the electrical power outlet box. The device includes a frame and at least one tab extending within the frame for holding a communication cable. The tab is capable of being deflected to a position abutting an inner face of a wall panel surrounding the frame.

Thus, the present invention provides an economic and inexpensive modification of an outlet box to incorporate both front and rear supports, for abutting all panels to prevent movement of the outlet box. The front support is provided as a dual function of a tab of a device for holding a communication cable. This thus provides a simple, economic structure, and avoids the need for any installer to provide an additional stud portion secured to the outlet box, while at the same time accommodating communication cables.

BRIEF DESCRIPTION OF THE DRAWINGS

For a better understanding of the present invention, and to show more clearly how it may be carried out into effect, reference will now be made, by way of example, to the accompanying drawings, which show a preferred embodiment of the present invention, and in which.

DESCRIPTION OF THE PREFERRED EMBODIMENT

Figure 1:
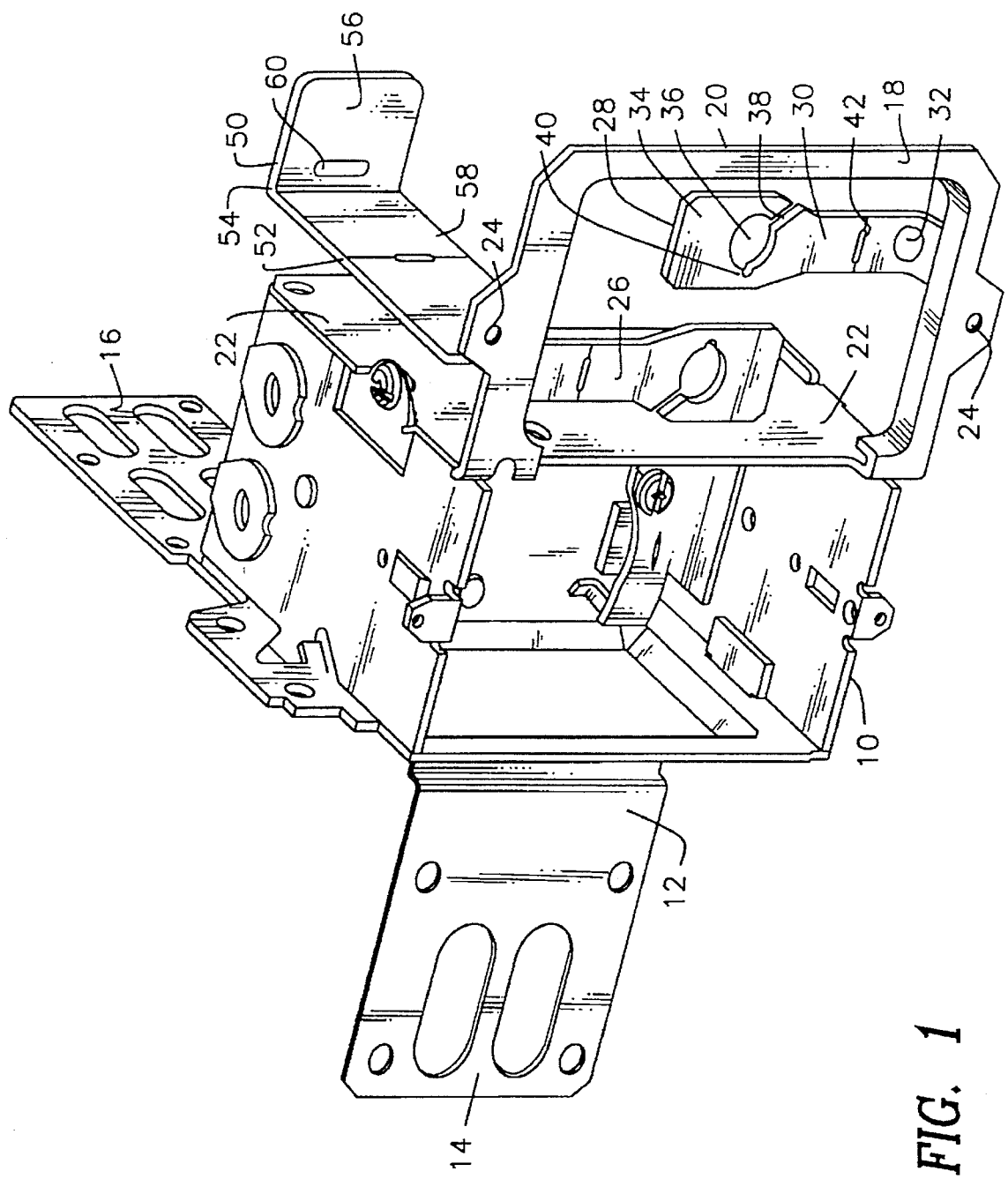
FIG. 1 is a perspective view of an outlet box incorporating a bracket in accordance with the present invention.

Referring first to FIG. 1, there is shown an outlet box generally indicated by the reference 10. The outlet box itself can be of essentially known construction. Thus, in known manner, the outlet box is formed from a number of plates secured together by means of interlocking tabs, projections, recesses and screws. It includes partially cut away portions, serving as knockouts, for the insertion of cable clamps. It also includes, internally, a cable clamp. Thus, the basic configuration of the outlet box can be determined by local electrical codes.

On its left hand side, as viewed in FIG. 1, the outlet box 10 is provided with a generally L-shaped bracket 12 including a front portion 14 and rearwardly extending portion 16, for mounting the outlet box 10 to a stud, as detailed below. In known manner, the mounting bracket 12 can be attached to the side of the outlet box 10, or integrally formed with it.

Now, in accordance with the subject matter of our earlier application Canadian Patent Application Serial No. 2,048,524, there is provided a device 18 on the right hand side of the outlet box 10, as seen in FIG. 1. Here, the device 18 is integral with the side of the outlet box 10. The device 18 comprises a frame having a main portion 20, extending perpendicularly to the side wall of the outlet box, indicated at 22, this side wall 22 forming a base portion of the device 18.

At the top and bottom of the main frame portion 20, openings 24 are provided, to enable a wall plate to be secured.

Tabs 26, 28 extend from the top and bottom of the main portion 20, respectively. Tabs 26, 28 are generally identical, and are described in relation to the tab 28. Tab 28 has a neck portion 30, with an aperture 32 where it is connected to the frame. At its free end, it has a head portion 34 provided with a circular hole 36. To permit access to this hole 36, there is a slot 38, and generally opposite this a second, closed-ended slot 40. The slots 38, 40 permit a cable to be slid into the hole 36, and further enable the slot 38 to be opened for this purpose and then at least partially closed again, by manually bending the head portion 34.

The neck portion 30 includes means to enable it to be bent backwards to abut the inside surface of a drywall panel to limit forward movement after attachment of the communication connector bracket, as detailed below. This means comprises one or both of a score and elongate slot, as shown at 42. The score comprises a cut part way through the metal of the neck.

To limit backward movement, a rear support bracket 50 is provided. As shown, the bracket 50 is formed from a generally rectangular piece of sheet metal, with rounded corners. It includes, like the neck portion 30, a weakened portion formed by a slot and/or score line, shown at 52. This enables the rear portion of the bracket 50 to be readily removed if it is not required or bent to a different configuration. At 54, a 90° angle is formed between a rear panel 56 and a side panel 58. The rear panel 56 is further provided with an elongate slot 60, for screws, or other attachment elements, or to allow a flat screwdriver tip to enter and act as a lever to aid in bending the rear support bracket 50 around the weakened portion formed by a slot and/or score line, shown at 52.

Figure 2:
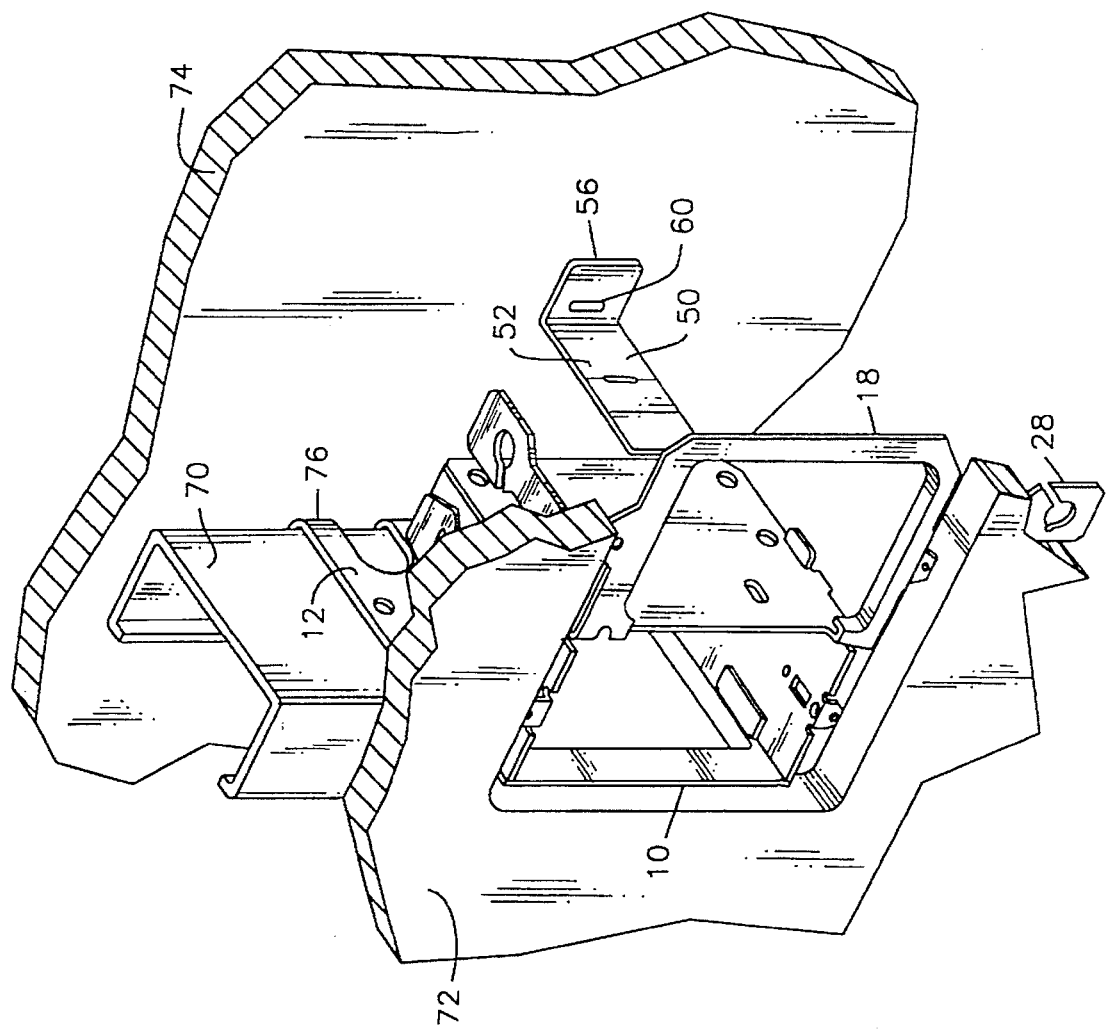
FIG. 2 is a perspective view, in partial section, of a wall incorporating the outlet box of FIG. 1.

Referring now to FIG. 2, this shows a stud 70, provided with front and rear drywall panels 72, 74 (designated for convenience as front and rear here, although they would usually form opposite sides of a dividing wall). The outlet box 10 is secured to the stud 70 by means of its mounting bracket 12. The rear portion of the bracket 16 would be bent around the stud 70, as indicated at 76, and then secured in place with screws in known manner. The mounting bracket 12 is not preformed to the necessary shape, to enable its usage on other studs, of greater depth.

The rear support bracket 50 is dimensioned, to correspond to the standard dimensions of conventional metal stud 70. Thus, as shown in FIG. 2, its rear panel 56 will abut the rear drywall panel 74. For some usages, as desired, the screws or other attachment elements can be inserted through the slot 60 to secure the rear panel 56 to the drywall panel 74.

However, if a stud of smaller dimensions is provided, then the weakened portion 52 enables the bracket 50 to be bent to the necessary shape. Alternatively, where the rear support is simply not required, then the weakened portion 52 enables most of the support bracket 50 to be removed. Note that the slot 60 can be used to secure spacing pieces in position, if oversized studs are present.

The front drywall panel 72 is provided with a cut out 78, for the outlet box 10 with the device 18.

Figure 4B:
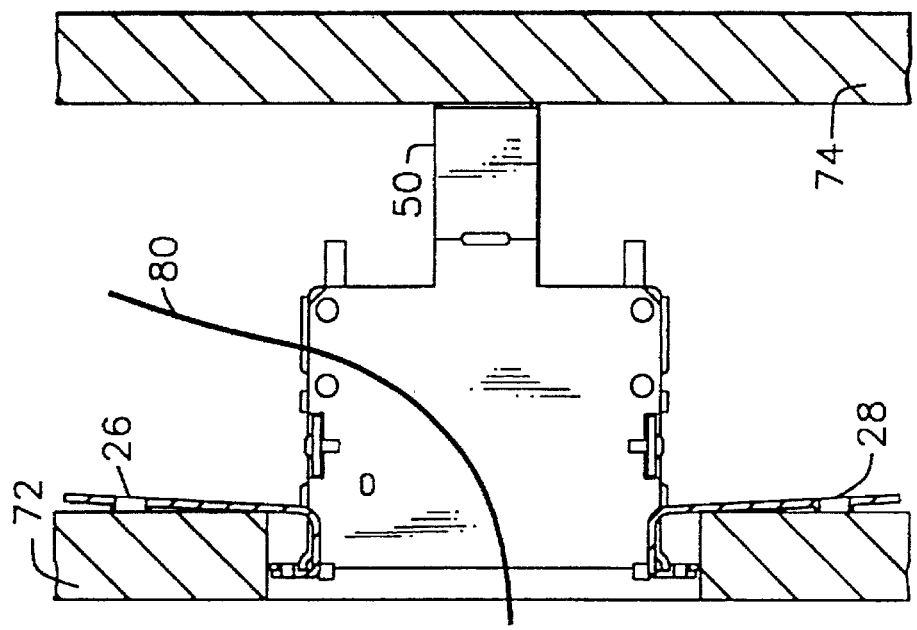
FIGS. 4a and 4b are vertical sectional views showing different mounting configurations of the outlet box of FIGS. 1 and 2.
Figure 4A:
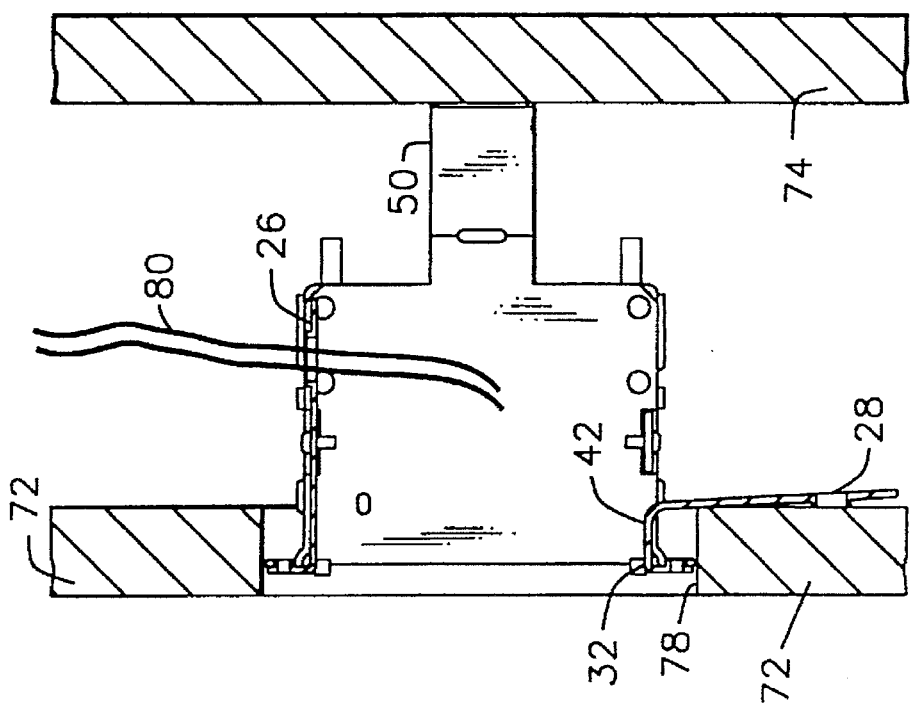

As shown in FIG. 4a, the top tab 26 can be used to secure cables, indicated at 80, for ready access by an electrician. As shown, it can be bent to a generally horizontal position, or initially left in the configuration as shown in FIG. 1. The slots 38, 40 enable the hole 36 to be opened and reclosed, as required, to locate the cables 80 in the hole 36.

As shown on the bottom of FIG. 4a, the other tab 28 is bent completely backwards and downwards through approximately 180° so that it abuts the inside of the drywall panel 72. As shown, the hole 36 is cut so as to have a slight rim that projects forwards, as viewed in FIG. 4a. As the tab 28 is bent rearwardly, about half of the bending occurs around the aperture 32. The score and slot 42 are located approximately as shown in FIG. 4a, where the other half of the bending occurs, to enable the tab 28 to bend to uniformly abut the rear of the panel 72.

Figure 5:
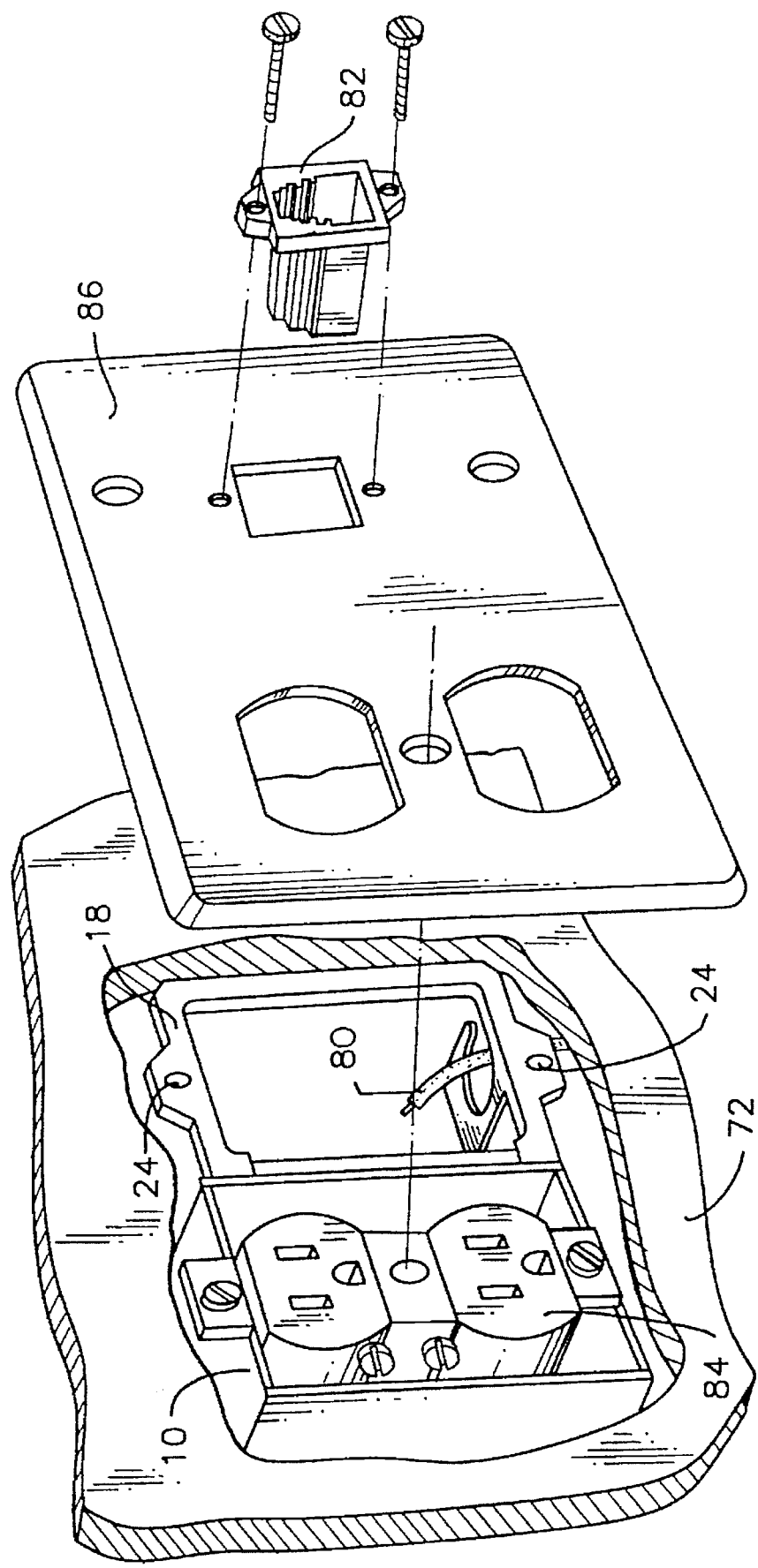
FIG. 5 is a perspective, exploded view of the outlet box of the present invention, as used with a receptacle and a cover plate.

Referring to FIG. 4b, for final installation, the cables 80 would be withdrawn slightly, and secured to a connector 82 (FIG. 5). The cable holding function is then no longer required and the tab 26 can be bent upwards, as shown in FIG. 4b. The two tabs 26, 28 then firmly abut the rear of the panel 72 to prevent forward movement. The outlet box 10 and device 18 are then firmly held from rearward movement by the rear support bracket 50, and by the tabs 26, 28 from forward movement.

A suitable receptacle 84 can then be secured in the box 10. In known manner, this can either be a twin receptacle or any other suitable receptacle, switch, etc., as desired. The connector 82 is secured to the cable 80, either before or after attachment of the connector 82 to a wall plate 86. Wall plate 86 is then secured by screws in known manner.

Figure 3:
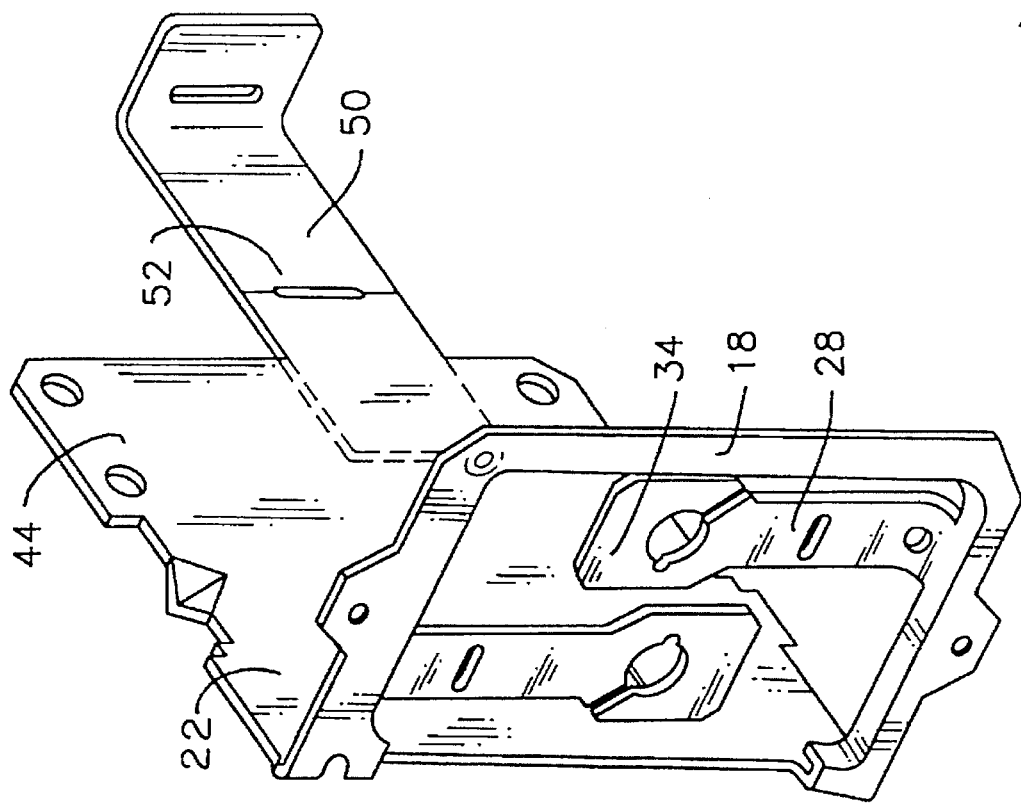
FIG. 3 is a perspective view, on a larger scale, of the bracket of the present invention.

Referring to FIG. 3, this shows a single element or plate 44, which as shown can be formed to provide the side wall of the outlet box 10, the rear support bracket 50 and the device 18. In known manner, it is preferably made of metal, and is formed from flat metal sheet stock by conventional metal forming operations, such as stamping, bending, etc. As shown in our earlier application, Canadian Patent Application Serial No. 2,048,524, the tabs for holding the cable in place can have a variety of configurations. The essential requirement is that each tab, at least initially, is capable of locating a communication cable in position, until it can be grasped and attached to a connector by an electrician. Thus, the slots 38, 40 need not be provided. The hole 36 could be other than circular. Instead of a hole 36, each tab could simply be elongate with a narrowed portion towards its free end, around which a cable can be secured as by knotting. As shown in FIG. 3, the rear support bracket 50 can be integral with the side wall 22 and other parts of the plate 44.

I claim:

1. An electrical outlet box having a top, bottom, first and second sides and a back, and defining a rectangular front opening, the outlet box including a rear support bracket secured to one of the sides thereof and extending rearwardly from the front opening for supporting the outlet box against one wall panel thereby limiting rearward movement thereof, one of the sides including a means for securing said outlet box to a structural wall member; and a means for abutting a second wall panel, said abutment means being provided adjacent to the front opening of the outlet box and being disposed on the other of the sides, said abutment means limiting forward movement of the outlet box relative to the second wall panel.

2. An outlet box as claimed in claim 1, wherein the rear support bracket is generally L-shaped.

3. An outlet box as claimed in claim 2, wherein the rear support bracket comprises a side panel and a rear panel which are perpendicular to one another, with the side panel being secured to the said one side of the outlet box, and wherein the side panel includes a weakened portion, to facilitate bending of the bracket.

4. An outlet box as claimed in claim 3, wherein the side panel is weakened by at least one of a slot therein and a score line across the side panel.

5. An outlet box as claimed in claim 4, which includes a slot in the rear panel.

6. An outlet box as claimed in claim 1, wherein the rear support bracket is separate from said one side of the outlet box and attached thereto.

7. An outlet box as claimed in claim 1, wherein said one side of the outlet box and the rear support bracket are integral with one another and formed from sheet material.

8. An electrical outlet box having a top, bottom, first and second sides and a back, and defining a rectangular front opening, the outlet box including a rear support bracket secured to one of the sides thereof and extending rearwardly from the front opening for supporting the outlet box against one wall panel to limit rearward movement thereof, and a device for holding a communication cable beside the outlet box, said device comprising a frame having a main portion attached to one of the sides of the outlet box, substantially at a right angle thereto and at least one tab, the at least one tab providing a means for securing the communication cable thereto, the at least one tab further providing abutment means, such that the at least one tab is deflectable to a position abutting a second wall panel to limit forward movement of the outlet box relative to the second wall panel.

9. An outlet box as claimed in claim 8, wherein the at least one tab comprises a neck portion extending inwardly from the main portion of the frame and adapted to permit deflection of the at least one tab, and a head portion adapted to be secured to the communication cable.

10. An outlet box as claimed in claim 9, wherein the neck portion includes an aperture adjacent the main portion, to facilitate deflection of the at least one tab.

11. An outlet box as claimed in claim 10, wherein the neck portion includes a weakened portion including at least one of a slot and a score line, to facilitate deflection of the at least one tab to a position abutting the inner face of the second wall panel.

12. An outlet box as claimed in claim 9, 10 or 11, wherein the head portion of the at least one tab has a hole to receive and secure the communication cable.

13. An outlet box as claimed in claim 9, 10 or 11, wherein the head portion has a hole to receive the communication cable, and includes a first slot extending between the hole and a periphery of the head portion, and a second slot spaced from the first slot and extending from said hole part way through the head portion to form a zone of weakness, whereby the at least one tab is easily manually bendable between open and closed positions, to facilitate securing the communication cable.

14. An outlet box as claimed in claim 11, wherein the at least one tab is integral with the frame.

15. An outlet box as claimed in claim 14, wherein the frame is integral with said one side of the outlet box.

16. An outlet box as claimed in claim 15, wherein the rear support bracket is integral with said one side of the outlet box.

17. An outlet box as claimed in claim 14, 15 or 16, wherein said device is made of metal and said main portion defines a central opening in which the at least one tab is initially located, and said metal has been folded around said central opening to provide a smooth surface so as not to damage the communication cable.

18. An outlet box as claimed in claim 14, 15 or 16, wherein said device is made of metal and said main portion defines a central opening in which the at least one tab is initially located, which metal has been folded around said central opening to provide a smooth surface so as not to damage the communication cable and wherein said device is formed from sheet metal.

19. An outlet box as claimed in claim 16, wherein said main portion of the frame is substantially rectangular and has threaded holes through which to receive screws for securing a wall plate.

20. An outlet box as claimed in claim 16, wherein the rear support bracket is generally L-shaped having a side panel and a rear panel, with the side panel attached to said one side of the outlet box and the rear panel being generally perpendicular thereto, and wherein the side panel includes a weakened portion provided by at least one of a score line and a slot, to enable bending of the rear support bracket.

21. A plate for use in forming an outlet box, the plate comprising:

a side portion including means for attachment to top, bottom, and back portions of an outlet box; and a rear support bracket comprising a side panel and a rear panel, the side panel being substantially coplanar with said one side portion and attached thereto, and the rear panel being generally perpendicular to the side panel, the rear panel of the rear support bracket being provided to abut a wall panel; and a device for holding a communication cable beside the outlet box, said device comprising a frame attached to the side portion, the frame defining a central opening, the frame extending generally perpendicularly to the side portion, and at least one tab extending from the frame into the central opening, the at least one tab providing a means for securing the communication cable thereto and being deflectable to a position abutting an inner face of a wall panel surrounding the frame to prevent forward movement of the frame relative to the wall panel.

22. The plate as claimed in claim 21, wherein the side panel of the rear mounting bracket includes a weakened portion comprising at least one of a slot and a score line.

23. The plate as claimed in claim 22, which includes a slot in the rear panel of the rear support bracket.

24. The plate as claimed in claim 23, in which the at least one tab comprises a neck portion and a head portion defining an opening for receiving and securing the communication cable.

25. The plate as claimed in claim 22, wherein each tab comprises a neck portion and a head portion, said means for securing the communication cable including a hole in said head portion for receiving and securing the communication cable, and a weakened portion comprising at least one of a slot and a score line to enable the at least one tab to be deflected to a position closely abutting the inner face of the wall panel around the frame.

26. The plate as claimed in claim 25, wherein the at least one tab includes an aperture adjacent the frame to facilitate deflection of the at least one tab.

27. The plate as claimed in claim 26, wherein the at least one tab includes a first slot extending between the hole in the head portion and the periphery of the head portion, and a second slot, generally opposite the first slot extending part way through the head portion, to enable the head portion to be easily manually bendable between opened and closed positions.

28. The plate as claimed in claim 27, wherein the side portion, the rear support bracket and the frame are integrally formed from sheet material.

29. The plate as claimed in claim 27, wherein the side portion, the rear support bracket and the plate are integrally formed from sheet metal, and wherein the metal is folded back around the central opening to provide a smooth surface, to prevent damage to communication cables.

30. A cable holding device for holding a communication cable beside an electrical power outlet box, said device comprising:

a frame having a main portion connected to a side of an outlet box substantially at a right angle thereto, said frame having at least one tab, the at least one tab providing a means for securing the communication cable, the at least one tab further providing abutment means, the at least one tab being deflectable to a position abutting an inner face of a wall panel surrounding the frame, to prevent forward movement of the frame relative to the wall panel.

31. A cable holding device as claimed in claim 30, wherein the frame further includes a side portion, the side portion being continuous with the main portion, the side portion of the frame including means for attachment to a top, a bottom and a back of the outlet box, to complete the outlet box.

32. A cable holding device as claimed in claim 30, wherein the at least one tab comprises a neck portion extending inwardly from the main portion of the frame and including the deflection means, and a head portion adapted to be secured to the communication cable and continuous with the neck portion.

33. A cable holding device as claimed in claim 32, wherein the deflection means includes an aperture, in the neck portion, adjacent to the main portion, to facilitate deflection of the at least one tab.

34. A cable holding device as claimed in claim 33, wherein the deflection means includes in the neck portion, a weakened portion including at least one of a slot or a score line, to facilitate deflection of the at least one tab to the position abutting the inner face of the wall panel. adapted to permit deflection of the at least one tab, and a head portion adapted to be secured to the communication cable.

* * * * *